United States Patent
Murase et al.

(10) Patent No.: US 9,286,513 B2
(45) Date of Patent: Mar. 15, 2016

(54) IMAGE PROCESSING APPARATUS, METHOD, AND STORAGE MEDIUM

(71) Applicant: FUJITSU LIMITED, Kawasaki-shi, Kanagawa (JP)

(72) Inventors: Taichi Murase, Kawasaki (JP); Takahiro Matsuda, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 24 days.

(21) Appl. No.: 14/061,030

(22) Filed: Oct. 23, 2013

(65) Prior Publication Data

US 2014/0169625 A1 Jun. 19, 2014

(30) Foreign Application Priority Data

Dec. 18, 2012 (JP) .................................. 2012-276106

(51) Int. Cl.
G06K 9/00 (2006.01)
G06F 3/01 (2006.01)

(52) U.S. Cl.
CPC .................................. G06K 9/00389 (2013.01)

(58) Field of Classification Search
USPC ........................................................ 382/103
See application file for complete search history.

(56) References Cited

U.S. PATENT DOCUMENTS

2009/0300553 A1* 12/2009 Pettigrew et al. ............. 715/856
2011/0194774 A1  8/2011 Saijo
2012/0068917 A1*  3/2012 Huang et al. .................. 345/156

FOREIGN PATENT DOCUMENTS

JP  2003-346162     12/2003
JP  2011-86052       4/2011
WO  WO 2011/001761   1/2011

OTHER PUBLICATIONS

N. Tanibata, N. Shimada, and Y. Shirai, "Extraction of Hand Features for Recognition of Sign Language Words," Proc. Int'l Conf. Vision Interface, pp. 391-398, 2002. Accessed on Dec. 31, 2014 http://www.cipprs.org/papers/VI/VI2002/pp391-398-Tanibata-et-al-2002.pdf.*
Y Chai, "Homogeneity Based Background Subtraction for Robust Hand Pose Recognition: Focusing on the Digital Game Interface." Accessed on Dec. 31, 2014 http://ieeexplore.ieee.org/xpls/abs_all.jsp?arnumber=4293687.*
M. Kolsch and M. Turk. Flocks of Features for Tracking Articulated Objects. In B. Kisacanim, V. Pavlovic, and T. Huang editors, "Real-Time Vision for Human-Computer Interaction," chapter 9. Springer-Verlang, 2005. Accessed on Jan. 6, 2015 http://www.cs.ucsb.edu/~mturk/pubs/KolschBook05.pdf.*

* cited by examiner

Primary Examiner — Utpal Shah
Assistant Examiner — Kate R Duffy
(74) Attorney, Agent, or Firm — Staas & Halsey LLP

(57) ABSTRACT

An image processing apparatus includes: a processor configured to: store information on a reference area that has been extracted from a first image not including a target object by using a condition regarding color, generate, by using the condition, information on a target area in a second image that has been captured at a point in time different from a point in time at which the first image has been captured, determine, by using the target area and the reference area, whether or not there is an overlap between the reference area and the target object, when the overlap exists, identify an overlap area, and extract, by using the difference area between the reference area and the target area, and the overlap area, the target object from the second image.

15 Claims, 14 Drawing Sheets

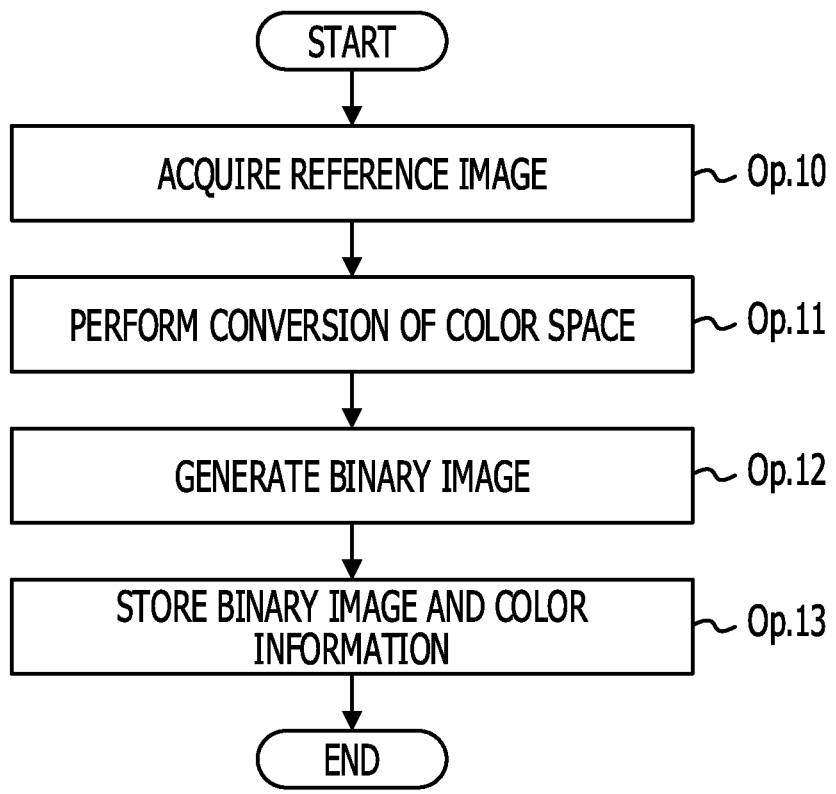

IMAGE PROCESSING APPARATUS, METHOD, AND STORAGE MEDIUM

CROSS-REFERENCE TO RELATED APPLICATION

This application is based upon and claims the benefit of priority of the prior Japanese Patent Application No. 2012-276106, filed on Dec. 18, 2012, the entire contents of which are incorporated herein by reference.

FIELD

The embodiments discussed herein are related to a technique in which a target object is extracted from an image.

BACKGROUND

In recent years, in addition to a mouse, a pen tablet, and a touchpad which serve as input devices with which data is input to a computer and the like, a data input technique in which data is input by using a user's movement or posture has been studied.

For example, a human interface technique is known in which the shape of a user's hand is extracted from an image and a command corresponding to the shape is input. There is, for example, an input system that recognizes which of five fingers is or are raised and inputs various instructions to a computer or the like. The input system is disclosed in Japanese Laid-open Patent Publication No. 2003-346162.

The input system converts an input image into an image in a hue-saturation-value (HSV) color system so as to extract a skin color component. Then, the image is binarized into the skin color component and the other components, and an area having a maximum area in an obtained binary image is extracted. Furthermore, a smoothing process or the like is performed and a hand area in the image is thereby determined. Then, the input system recognizes the shape of the hand area and inputs various instructions.

SUMMARY

According to an aspect of the invention, an image processing apparatus includes: a memory; and a processor coupled to the memory and configured to: store, in the memory, reference area information on a reference area that has been extracted from a first image not including a target object by using a condition regarding color, generate, by using the condition, target area information on a target area in a second image that has been captured at a point in time different from a point in time at which the first image has been captured, determine, by using the target area and the reference area, whether or not there is an overlap between the reference area and the target object, when the overlap does not exist, extract, by using a difference area between the reference area and the target area, the target object from the second image, and when the overlap exists, identify, by using color information of a pixel corresponding to the reference area in the second image, an overlap area of the overlap, and extract, by using the difference area and the overlap area, the target object from the second image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a flowchart of a process of generating information on a reference area;

DESCRIPTION OF EMBODIMENTS

An input system is capable of extracting a skin color component from an image. However, when a skin color of a hand and a skin color of something other than the hand exist in the image, the input system is incapable of identifying a hand area from the image. There is, for example, the case where a skin color is included in the background, or the case where a face or the like exists in the image.

That is, in the case where a target object which a user wants to extract and an object other than the target object exist in a taken image, when a color of the whole or part of the object other than the target object is similar to a color of the target object, the technique of the input system is incapable of extracting only the area of the target object from the image.

An object of a technique disclosed in embodiments is to extract the area of a target object from an image including the target object and an object having a color similar to that of the target object.

The embodiments will be described in detail below. The following embodiments may be appropriately combined within the range in which no inconsistency in the contents of processes is generated. Each embodiment will be described below with reference to the drawings.

Figure 1:
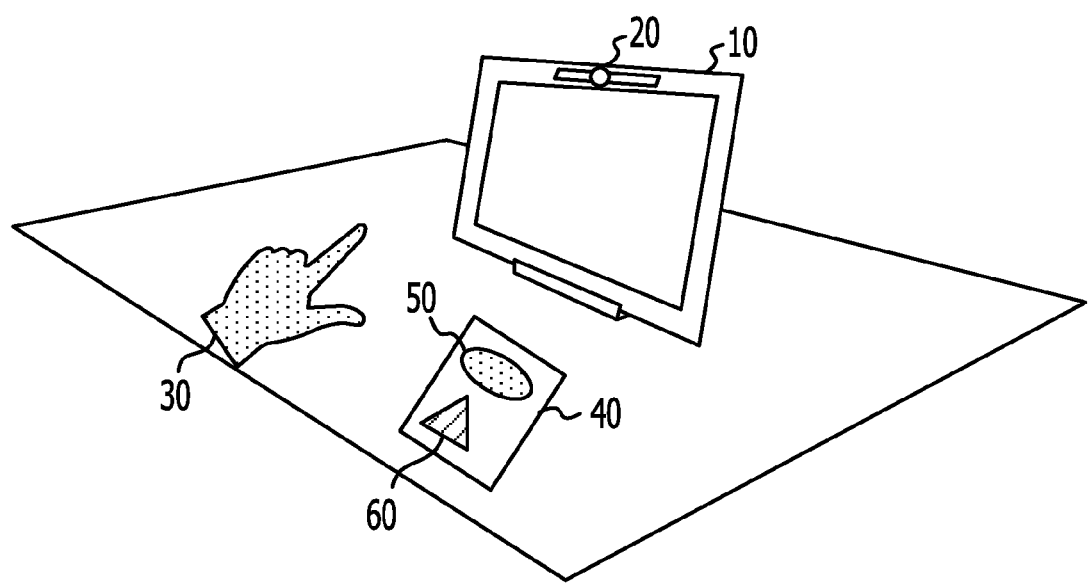
FIG. 1 illustrates an example of a usage pattern of an information processing apparatus including an image processing apparatus according to embodiments.

First, a usage pattern of an information processing apparatus in the embodiments will be described. FIG. 1 illustrates an example of the usage pattern of the information processing apparatus including an image processing apparatus according to the embodiments. In the embodiments, the image processing apparatus extracts a finger as a target object.

Examples of an information processing apparatus 10 include a desktop personal computer (PC), a slate PC, a tablet PC, a smartphone, a scanner, a game machine, and a household electrical appliance. In FIG. 1, the information processing apparatus 10 is a tablet computer including a camera 20.

The camera 20 takes a plurality of images at certain frame intervals. A user places a hand 30 within the range in which the camera 20 may take an image, and performs a movement. In the embodiments, it is assumed that the plurality of taken images have the same background. In some of the plurality of images, the user's hand has been captured together with the background.

The information processing apparatus 10 includes an input device. The input device includes the image processing apparatus. The image processing apparatus extracts the area of the user's finger from an image taken by the camera 20. Hereinafter, the area of the user's finger in an image is referred to as a hand area.

The input device inputs information to the information processing apparatus 10 by using the hand area extracted by the image processing apparatus. For example, a specific command or character information is input. In the embodiments, the input device recognizes the shape of the user's finger by using the extracted hand area, and inputs a specific command corresponding to the shape to the information processing apparatus 10. The information processing apparatus 10 performs a process corresponding to the input command or the like. For example, the user performs a movement for indicating the shape of a finger corresponding to a command which the user wants to input, and the information processing apparatus 10 thereby executes a certain command.

Also, like a software keyboard, the input device may use the extracted hand area and thereby input specific data to the information processing apparatus 10 on the basis of the position of a finger with which a touch operation is performed.

In the example illustrated in FIG. 1, an image to be subjected to processing performed by the image processing apparatus is captured by the camera 20 included in the information processing apparatus 10, and acquired. Acquisition of the image is not limited to this. The image processing apparatus may acquire an image via a network or from a camera connected to the information processing apparatus 10. Also, the camera 20 may be provided at another position instead of the position illustrated in FIG. 1.

Here, in the example illustrated in FIG. 1, paper 40 exists together with the hand 30 of the user within the range in which the camera 20 captures an image. It is assumed that an area 50 having a first color and an area 60 having a second color are printed on the paper 40.

A problem that occurs when a hand area is extracted will be described by using FIGS. 2A, 2B, 2C, and 2D. FIGS. 2A to 2D are diagrams illustrating a problem that occurs when a hand area is extracted.

A method in which, for example, an existing input system extracts a skin color component from an image by using a condition regarding color is effective in extracting a hand area. For example, in a binary image obtained by assigning "1 (black)" to a pixel having a skin color component in an image and "0 (white)" to a pixel having another component, an area having the skin color component is defined.

Here, when the skin color component is extracted, for example, color information of each pixel included in the image is used. For example, when a value represented in the HSV color system is employed as the color information, a pixel that satisfies a condition defined by the following equations 1 and 2 is extracted as the skin color component.

$$0.11 < H < 0.22 \quad \text{(equation 1)}$$

$$0.2 < S < 0.5 \quad \text{(equation 2)}$$

As a method of extracting a hand area, there is also a technique in which patterns of a finger are prepared in advance and a search for a finger in an image is made by using the prepared patterns. The technique of extracting a hand area by extracting a skin color component is more effective than the technique using the patterns in that an enormous number of patterns which are different in terms of the size or shape of a hand do not have to be prepared. However, the existing input system has the following problems.

Figure 2A:
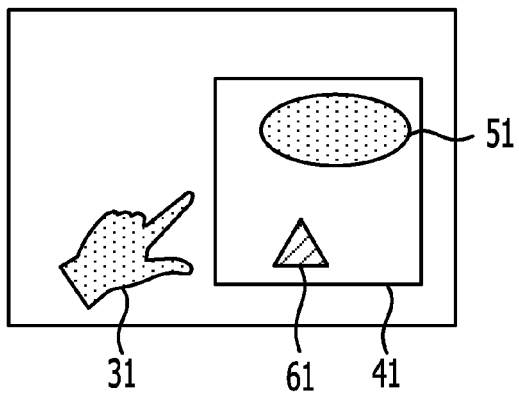
FIGS. 2A, 2B, 2C, and 2D are diagrams illustrating a problem that occurs when a hand area is extracted.

FIG. 2A illustrates an image captured by the camera 20 at a point in time. In the image illustrated in FIG. 2A, a hand area 31, a paper area 41, an area 51 having a first color, and an area 61 having a second color exist. Here, the first color is a skin color. It is assumed that color information of each pixel that constitutes the area 51 having the first color satisfies the above-described condition, as in the case of the hand area 31.

Figure 2B:
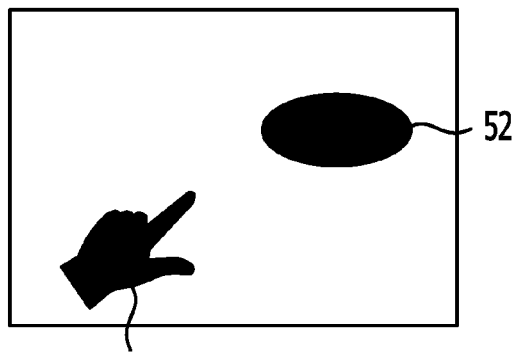

FIG. 2B illustrates a binary image obtained by binarizing the image in FIG. 2A. In this binarization, for example, the condition defined by the above equations 1 and 2 is used. In the binary image illustrated in FIG. 2B, a pixel of an area 32 corresponding to the hand area 31 and a pixel of an area 52 corresponding to the area 51 having the first color each have a pixel value "1 (black)". That is, the area 32 and the area 52, which have a skin color component, may be able to be extracted by using the binary image; however, only the area 32 corresponding to the hand area 31 may not be able to be extracted from the image.

Figure 2C:
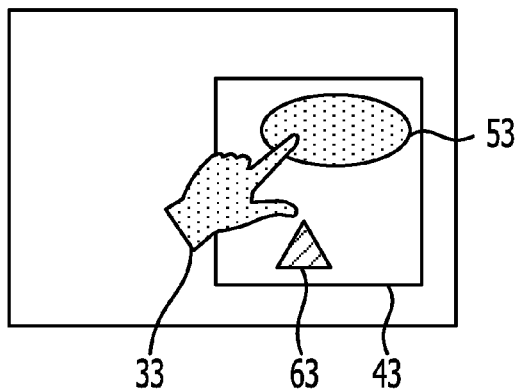

FIG. 2C illustrates an image captured by the camera 20 at a point in time different from the point in time in FIG. 2A. In the image illustrated in FIG. 2C, a hand area 33 overlaps an area 53 having a first color on the image. As in FIG. 2A, the first color is a skin color.

Figure 2D:
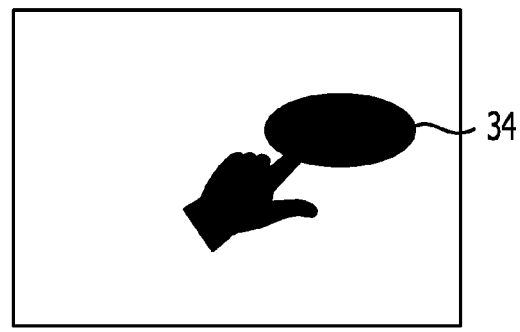

FIG. 2D illustrates a binary image obtained by binarizing the image in FIG. 2C. In this binarization, as in the case of the binarization in FIG. 2B, for example, the above-described condition is used. In the binary image illustrated in FIG. 2D, a pixel of an area 34 that includes an area corresponding to the hand area 33 and an area corresponding to the area 53 having the first color has a pixel value "1 (black)". That is, as in FIGS. 2A and 2B, the existing input system may not be able to extract only the area corresponding to the hand area 33 from the image.

In other words, when a condition set in accordance with a color component of a target object is used and an area having a color component that satisfies the condition is extracted as an area of the target object from an image, an area having a color similar to that of the target object is also extracted. In the technique disclosed in the embodiments, in the method of extracting a target object by using a color component, the target object is extracted even from an image that includes both an area having a color similar to that of the target object and an area of the target object.

First Embodiment

First, a first embodiment will be described.

Figure 3:
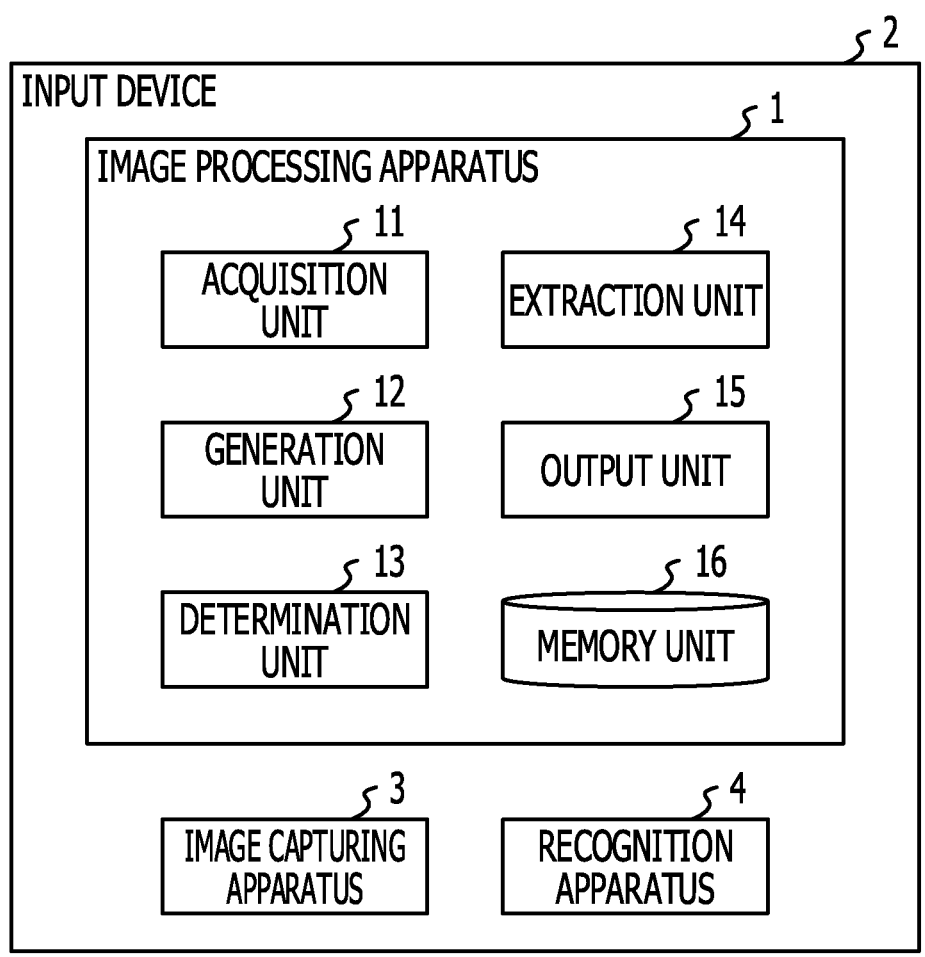
FIG. 3 is a functional block diagram of an image processing apparatus.

FIG. 3 is a functional block diagram of an image processing apparatus. In this embodiment, an image processing apparatus 1 is included in an input device 2. The input device 2 includes an image capturing apparatus 3 and a recognition apparatus 4 in addition to the image processing apparatus 1. Also, the input device 2 is included in the information processing apparatus 10 illustrated in FIG. 1.

The image processing apparatus 1 is a computer that extracts an area of a target object from an image. The image capturing apparatus 3 is an apparatus that takes a plurality of images at certain frame intervals. For example, the image capturing apparatus 3 is the camera 20. The recognition apparatus 4 is an apparatus that recognizes the shape of the target object by using an output from the image processing apparatus 1. For example, the recognition apparatus 4 recognizes the shape of a hand and issues a command corresponding to the shape to the information processing apparatus 10.

The image processing apparatus 1 includes an acquisition unit 11, a generation unit 12, a determination unit 13, an extraction unit 14, an output unit 15, and a memory unit 16. The acquisition unit 11 acquires the image from the image capturing apparatus 3. Actually, the acquisition unit 11 acquires image information regarding the image. The image information includes color information of each pixel. The color information may be, for example, information represented in a red-green-blue (RGB) color system other than the HSV color system.

The generation unit 12 generates information on a target area by using color information and a condition regarding color. The target area is an area including a pixel whose color information satisfies the condition regarding color. For example, the target area is an area including a pixel that expresses a skin color in the image. The pixel expressing the skin color is a pixel that satisfies the condition regarding color.

For example, the generation unit 12 converts a color space of the color information into a color space in the HSV color system. Other than the HSV color system, even a color system may be employed as long as the color of the target object is recognizable with a color space in the color system. The generation unit 12 uses the converted color information and the condition regarding color defined by the equations 1 and 2, and generates a binary image obtained by assigning "1" to a pixel expressing a skin color and "0" to a pixel expressing a color other than the skin color. The range of values of the condition regarding color defined by the equations 1 and 2 may be appropriately changed. Hereinafter, the condition regarding color defined by the equations 1 and 2 may be merely referred to as a condition. In this embodiment, the target area is an area constituted by a pixel having a pixel value "1" in the binary image. Information on a target image is information on a binary image of an image subjected to processing.

When the acquired image is a reference image that does not include the target object, the generation unit 12 generates information on a reference area from the reference image. The reference area is an area constituted by a pixel having color information that satisfies the condition regarding color in the reference image. For example, the reference area is an area including a pixel that expresses a skin color in the reference image. Also, the reference area is an area constituted by a pixel having a pixel value "1" in a binary image of the reference image.

Information on the reference area includes information on the binary image of the reference image. In addition, the information on the reference area includes color information of each pixel corresponding to the reference area in the reference image. When a plurality of reference areas exist in one reference image, identification information may be assigned to each reference area so as to mutually identify the reference areas.

A determination as to whether or not the acquired image is a reference image is made in accordance with the user's instruction. For example, the user provides an instruction to register a reference image to the information processing apparatus 10 before the user places a target object (hand) in front of the camera. Then, the image capturing apparatus 3 takes an image in accordance with the registration instruction. The generation unit 12 determines that the image taken in accordance with the registration instruction is a reference image. The target object is not included in the reference image taken in accordance with the registration instruction. In other words, an object that exists in the reference image is used as the background so as to generate information on a reference area.

The form of a determination as to whether or not an acquired image is a reference image is not limited to the form using a registration instruction. For example, the generation unit 12 analyzes a plurality of images taken by the image capturing apparatus 3. Then, when there is no change between the plurality of images, the generation unit 12 may determine that an acquired image is a reference image.

The determination unit 13 determines whether or not the reference area and the target object overlap each other by using the information on the target area and the information on the reference area. That is, the determination unit 13 determines whether or not there is an overlap between a skin color area in the background and a hand area.

For example, the determination unit 13 generates a difference image between the binary image defining the target area and the binary image defining the reference area. In the difference image, a pixel of a difference area obtained by removing the reference area from the target area has the pixel value "1".

When, among pixels of the difference area, there are a certain number or more of pixels in contact with the reference area, the determination unit 13 determines that there is an overlap between the reference area and the target object. Even when the difference area and the reference area are not actually in contact with each other, the determination unit 13 may determine that a case where the reference area exists within a certain range from the difference area is equivalent to the case where the difference area and the reference area are in contact with each other.

The extraction unit 14 extracts the target object from the image in accordance with a determination result of the determination unit 13. When the determination unit 13 determines that the reference area and the target object do not overlap each other, the extraction unit 14 extracts, as the area of the target object, an area corresponding to the difference area from the image subjected to processing.

On the other hand, when the determination unit 13 determines that the reference area and the target object overlap each other, the extraction unit 14 identifies an overlap area between the reference area and the target object. Then, the extraction unit 14 extracts, as the area of the target object, an area corresponding to both the difference area and the overlap area from the image subjected to processing.

For example, when the determination unit 13 determines that the reference area and the target object overlap each other, the extraction unit 14 performs edge detection. Then, the extraction unit 14 determines an outline of the overlap area by using detected edges. The extraction unit 14 identifies, as the overlap area, an inner portion of the outline in the image.

The edges are detected by using a difference between color information of each pixel of the reference area in the reference image and color information of each pixel corresponding to the reference area in the image subjected to processing. For example, the extraction unit 14 obtains a difference between the pixels in terms of H, S, and V of each pixel. The extraction unit 14 detects the edges by using a change in a difference value of each pixel. As edge detection, Canny edge detection or the like may be used.

The output unit 15 outputs an extraction result to the recognition apparatus 4. For example, the output unit 15 outputs a mask image obtained by masking an area other than the area of the target object in the image subjected to processing to the recognition apparatus 4. In this embodiment, the mask image is generated by the extraction unit 14; alternatively, it may be generated by the output unit 15.

The memory unit 16 stores various pieces of information. For example, the information on the reference area is stored. Also, the memory unit 16 may temporarily store the image subjected to processing or the information on the target area.

FIG. 4 is a flowchart of a process of generating information on a reference area. The generation unit 12 acquires a reference image via the acquisition unit 11 (Op. 10). The generation unit 12 determines whether or not an acquired image is a reference image with the above-described method.

The generation unit 12 converts a color space of color information of the reference image into a color space in the HSV color system (Op. 11). The generation unit 12 generates a binary image by using the converted color information (Op. 12). The binary image is, for example, information on a reference area. Also, in the binary image, for example, a pixel value is 0 or 1 as described above. The generation unit 12 stores the generated binary image and the color information of the reference area in the memory unit 16 (Op. 13). In addition to the color information of the reference area, color information of the entire reference image may be stored.

Figure 5A:
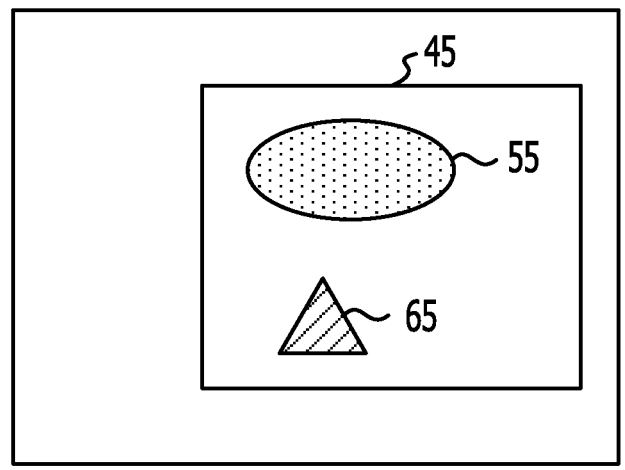
FIGS. 5A and 5B are diagrams illustrating a reference image and a reference area.
Figure 5B:
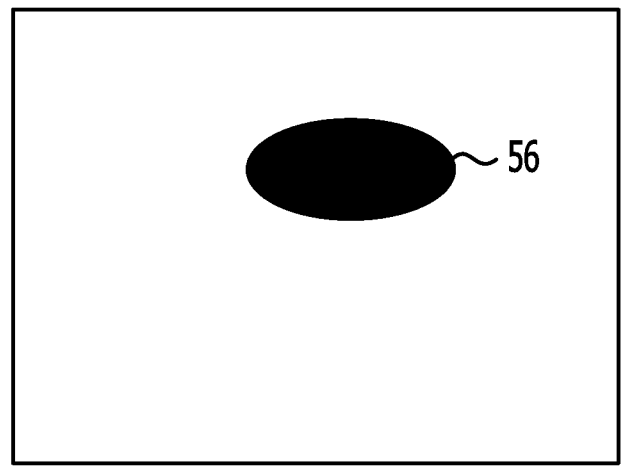

FIGS. 5A and 5B are diagrams illustrating a reference image and a reference area. FIG. 5A illustrates a reference image. In the reference image illustrated in FIG. 5A, there are included an area 45 corresponding to the paper 40, an area 55 corresponding to the area 50 having the first color, and an area 65 corresponding to the area 60 having the second color. The paper 40 and the areas 50 and 60 are illustrated in FIG. 1.

FIG. 5B illustrates a binary image of the reference image. In the binary image, a reference area 56 that satisfies the condition regarding color by using color information in the reference image is included. That is, the areas 45 and 65 in the reference image are not included in the binary image.

In the case where either a right or left hand is defined as a target object, the other hand may be dealt with as an area having a color similar to that of the target object. When a movement of only the one hand for input is performed and the other hand does not move, the image processing apparatus 1 extracts the one hand, which is the target object. In this case, it is assumed that an image obtained when the user places the other hand in an area in which the image capturing apparatus 3 captures an image is a reference image. Then the process flow illustrated in FIG. 4 is performed by using the reference image including the other hand.

Figure 6:
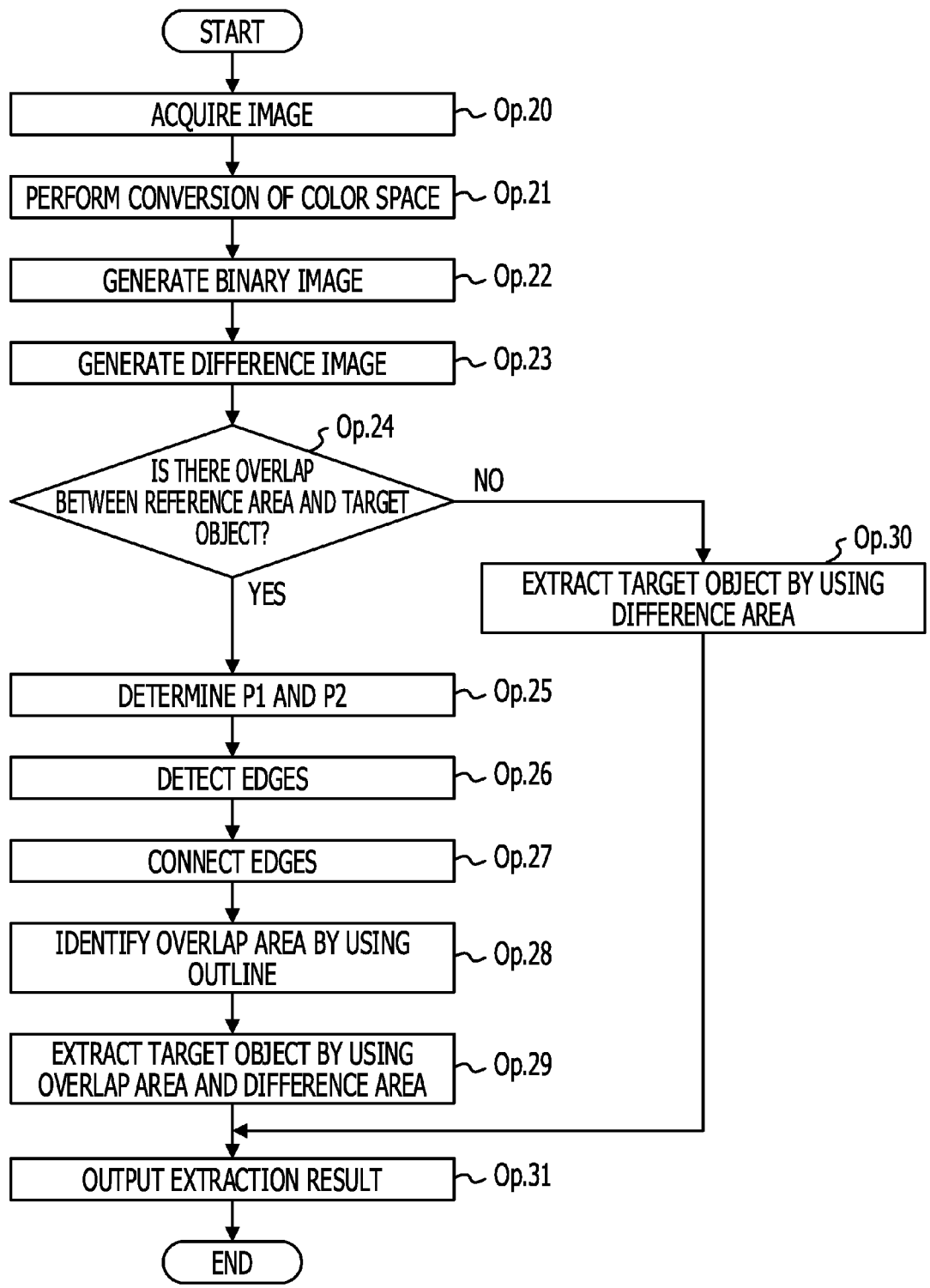
FIG. 6 is a flowchart of an image processing method.

Next, an image processing method according to this embodiment will be described. FIG. 6 is a flowchart of the image processing method.

The generation unit 12 acquires an image (Op. 20). It is assumed that an image other than a reference image is an image subjected to processing, and the following image processing method is executed. Next, the generation unit 12 converts a color space of color information of the image into a color space in the HSV color system (Op. 21). The generation unit 12 generates a binary image by using the condition regarding color (Op. 22). The binary image represents a target area.

The determination unit 13 generates a difference image by using a binary image defining a reference area obtained from the memory unit 16 and the generated binary image (Op. 23). In the difference image, a difference area is defined.

Figure 7A:
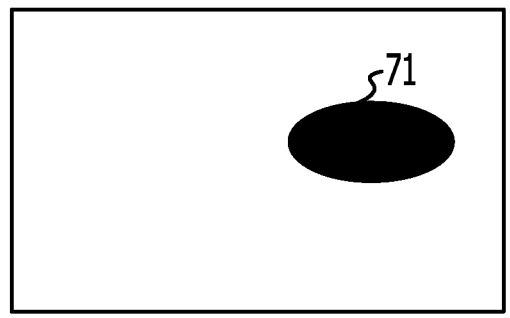
FIGS. 7A, 7B, and 7C are diagrams illustrating a difference image and a difference area.
Figure 7B:
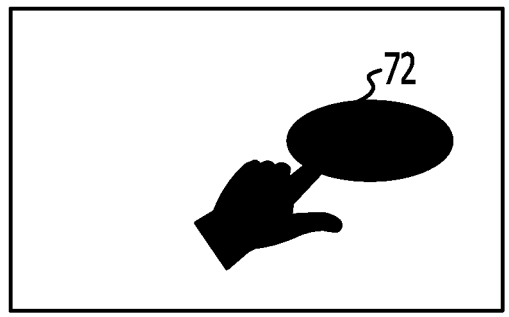
Figure 7C:
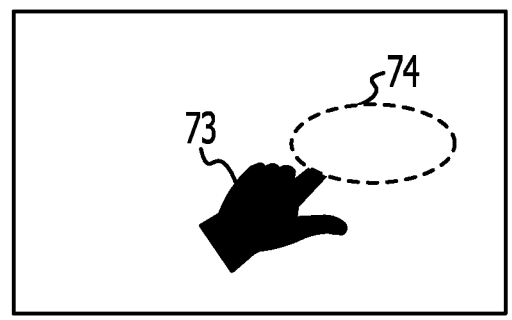

FIGS. 7A, 7B, and 7C are diagrams illustrating a difference image and a difference area. FIG. 7A illustrates a binary image defining a reference area 71. FIG. 7B illustrates a binary image defining a target area 72. FIG. 7C illustrates a binary image defining a difference area 73. A binary image defining a difference area is a difference image.

A pixel value of each pixel of the binary image defining the reference area is subtracted from a value of each pixel of the binary image defining the target area, and the difference image obtained by assigning a pixel value "1" to a pixel that forms the difference area is thereby generated. That is, as in FIG. 7C, a portion obtained by removing the reference area from the target area is defined as the difference area. A dashed line 74 illustrated in FIG. 7C denotes the reference area; however, the dashed line does not appear on an actual difference image.

In FIGS. 7A to 7C, as an example, the case where, in the image subjected to processing, a hand area and a skin color area in the background overlap each other has been described. However, as in FIG. 2A, in the case where the hand area 31 and the area 51 having the first color (skin color) in the background do not overlap each other, only the area 32 illustrated in FIG. 2B remains as the difference area.

Next, the determination unit 13 determines whether or not there is an overlap between the reference area and an area of a target object (Op. 24). The determination unit 13 determines, from the positional relationship between the difference area in the difference image and the reference area, whether or not there is an overlap between the reference area and the target object. For example, when, among pixels of the difference area, there are a certain number or more of pixels in contact with the reference area, it is determined that there is an overlap between the reference area and the area of the target object.

When there is no overlap (No in Op. 24), the extraction unit 14 extracts the target object from the image subjected to processing by using the difference area (Op. 30). That is, the extraction unit 14 extracts, from the image subjected to processing, an area corresponding to the difference area in the difference image. For example, a mask image obtained by masking an area other than the area corresponding to the difference area is generated.

On the other hand, when there is an overlap (Yes in Op. 24), the extraction unit 14 determines positions P1 and P2 of two pixels among pixels which exist in the difference area and are in contact with the reference area (Op. 25). P1 and P2 denote, for example, positions of pixels that form an outline of the difference area, among pixels which exist in the difference area and are in contact with the reference area.

Next, the extraction unit 14 detects edges for an area portion corresponding to the reference area in the image subjected to processing by using a difference between color information of each pixel of the reference area obtained from the memory unit 16 and color information of each pixel corresponding to the reference area in the image subjected to processing (Op. 26). Then, the extraction unit 14 connects the detected edges by using the positions P1 and P2 (Op. 27).

Figure 8A:
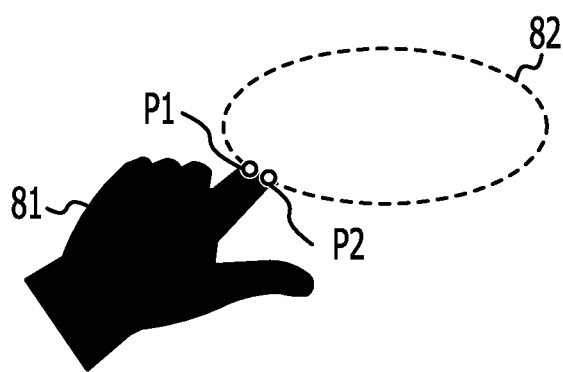
FIGS. 8A and 8B are diagrams illustrating a process of connecting edges.
Figure 8B:
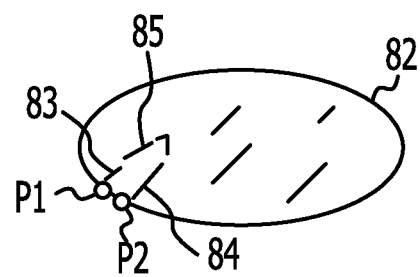

FIGS. 8A and 8B are diagrams illustrating a process of connecting edges. FIG. 8A illustrates an image of the positions P1 and P2 which are set at a boundary between a difference area 81 and a reference area 82. FIG. 8B illustrates edges detected in an area corresponding to the reference area, and the positions P1 and P2 in an edge image.

In the process of connecting edges, the extraction unit 14 identifies an edge 83 closest to the position P1 in the edge image. When a pixel at the position P1 forms part of an edge, the extraction unit 14 may follow the edge in a direction toward an inner portion of the reference area 82 and identify another edge closest to the pixel at the end of that first edge. Then, the extraction unit 14 follows the edge 83 and connects, to the edge 83, an edge 85 closest to the pixel at which the edge 83 terminates. In this case, the pixel at the end of the edge 85 close to the edge 83 is connected to the edge 83. Also, an edge-connecting process is performed from the position P2. That is, an edge 84 closest to the position P2 is identified, and then another edge is also connected to the edge 84. The extraction unit 14 repeatedly performs such a process of connecting edges.

In this way, from the positions P1 and P2, edges existing in the area corresponding to the reference area 82 in the image subjected to processing are connected, and edges defining an outline of an overlap portion between the reference area 82 and the target object are thereby identified. In edge detection, even when an outline of a target object may not be able to be detected as one edge, this process enables detection of the outline of the target object by connecting a plurality of edges. That is, an outline of an overlap portion is detected.

Next, the extraction unit 14 identifies an overlap area by using an outline of an overlap portion, which is the result of connecting edges (Op. 28). The extraction unit 14 identifies an inner portion of the outline as the overlap area. The inner portion is determined by using, for example, the curvature of each edge.

Then, the extraction unit 14 extracts the target object from the image subjected to processing by using the overlap area and the difference area (Op. 29). That is, in the image subjected to processing, an area corresponding to both the overlap area and the difference area is extracted as the area of the target object.

For example, the extraction unit 14 identifies a range and position of the area of the target object by using the overlap area and the difference area. Then, the extraction unit 14 removes, from the image subjected to processing, information on an area other than information on the range and position of the area of the target object, and thereby extracts the area of the target object. In this embodiment, an extraction result is a mask image obtained by masking an area other than the area of the target object.

The output unit 15 outputs the extraction result to the recognition apparatus 4 (Op. 31). Every time the image processing apparatus 1 acquires a new image, the image processing apparatus 1 executes the image processing method illustrated in the flow in FIG. 6. The image processing method may be executed at certain time intervals. The recognition apparatus 4 receives the extraction result from the output unit 15 of the image processing apparatus 1 and recognizes the shape of a hand area by using an existing technique. The recognition apparatus 4 inputs a command or the like corresponding to the shape to the information processing apparatus 10.

Figure 9:
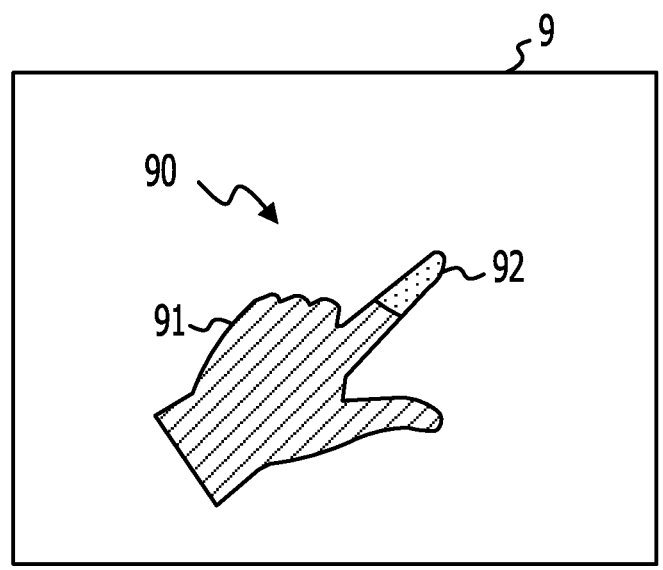
FIG. 9 illustrates a mask image.

FIG. 9 illustrates a mask image. A mask image 9 is an image obtained by masking an area other than a hand area 90 in the image subjected to processing. An area 91 illustrated in FIG. 9 is a hand area portion corresponding to the difference area. An area 92 is a hand area portion corresponding to the overlap area. The areas 91 and 92 form the hand area 90. Note that the areas 91 and 92 are not distinguished from each other in the mask image 9.

As described above, according to an aspect of the embodiments, an area of a target object may be extracted from an image that includes the target object and an area having a color similar to that of the target object. Furthermore, in this embodiment, even when the target object and the area having a color similar to that of the target object overlap each other in the image, the area of the target object may be extracted.

That is, even when a skin color area in the background and a hand, which is the target object, overlap each other, a hand area may be detected. When the overlap is detected, the image processing apparatus 1 may identify an overlap area and extract the hand area by using the identified overlap area.

Furthermore, when the overlap area is identified, edge detection is performed only in an area corresponding to a reference area. Hence, in comparison to the case where edge detection is performed on the entire image, the image processing apparatus 1 may provide a lower throughput for edge detection. Edges to be detected are limited to edges existing in the area corresponding to the reference area, and therefore the process for connecting edges is not performed on edges existing in an unwanted area; therefore, the image processing apparatus 1 may perform the edge-connecting process more accurately. That is, the image processing apparatus 1 may identify the overlap area more accurately.

In this embodiment, when no overlap is detected, the image processing apparatus 1 detects the hand area by using a difference area. That is, the image processing apparatus 1 does not perform edge detection or the like as long as no overlap is detected. Hence, the image processing apparatus 1 may appropriately switch between two processes described above in accordance with the absence or presence of an overlap, and perform an appropriate process.

Second Embodiment

Next, a second embodiment in which an even lower throughput is provided by further limiting a range in which edges are detected will be described.

The functional configuration of the image processing apparatus 1 is the same as that in the first embodiment. Note that the input device 2 includes two image capturing apparatuses that serve as the image capturing apparatus 3. The two image capturing apparatuses are provided, and the image processing apparatus 1 may thereby measure a distance z between the image capturing apparatus 3 and a target object. The distance z is the distance between a midpoint between positions at which the two image capturing apparatuses are provided, and one point of the target object.

As advance preparation, the acquisition unit 11 acquires an image of only a hand, which is the target object. Then, the generation unit 12 acquires a height H and a width W of the entire hand from the image. Subsequently, the memory unit 16 stores information on the height H and the width W of the entire hand.

Next, in an image processing method in which a hand area is extracted from an image subjected to processing, when the determination unit 13 determines that there is an overlap, the extraction unit 14 obtains the distance z by using the following equation 3. In this equation, f is the focal length of each image capturing apparatus, T is the distance between the image capturing apparatuses, and x1 and x2 are positions of the target objects in respective images captured by the image capturing apparatuses.

$$z = f \cdot T/(x1-x2) \quad \text{(equation 3)}$$

For example, when the extraction unit 14 calculates the distance z, for example, a difference area is assumed to be the target object. For example, a barycenter of the difference area in each of two images captured by the image capturing apparatuses is obtained. Positions of two barycenters are denoted by x1 and x2. Information on a target area extracted by using a previously acquired image may be used.

Next, the extraction unit 14 determines a candidate area by using an equation 4. Then, the extraction unit 14 performs edge detection on, as a processing area, an area in which the candidate area and a reference area overlap each other.

$$R = (\sqrt[4]{H^2 + W^2}) \cdot f(z) \quad \text{(equation 4)}$$

In this equation, R is a radius of the candidate area, f(z) is a coefficient corresponding to the distance z, and f(z) is preset depending on a parameter of each image capturing apparatus. The equation 4 is an equation used to calculate, in accordance with a size of the hand registered in advance, a maximum range in which the hand may exist in the image subjected to processing.

Figure 10:
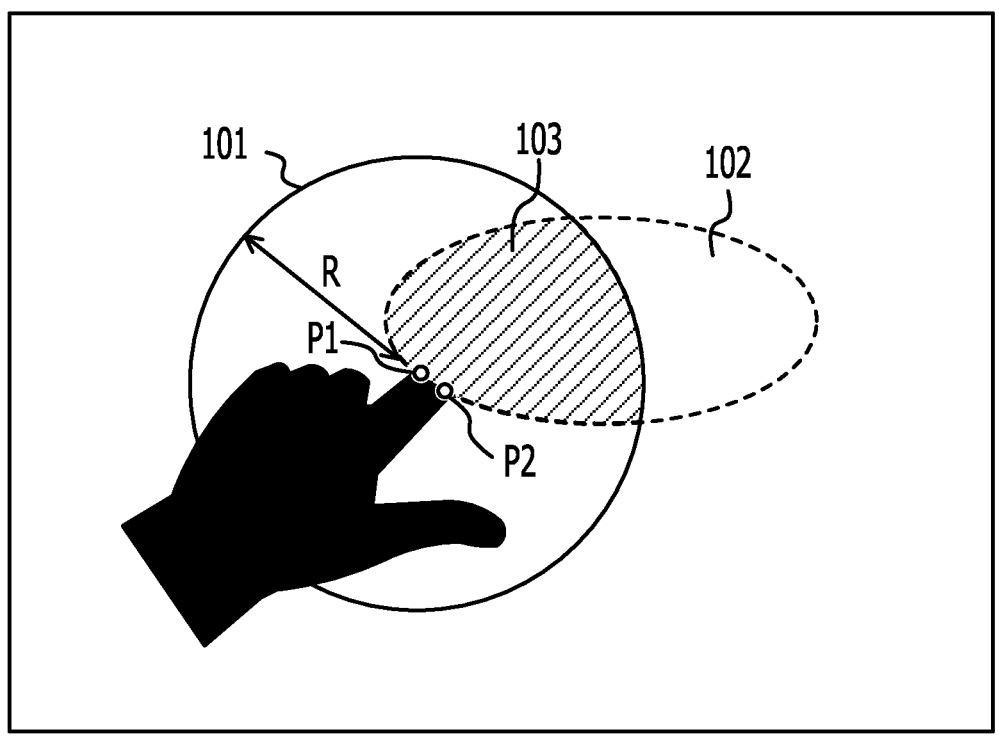
FIG. 10 is a diagram illustrating a processing area.

FIG. 10 is a diagram illustrating a processing area. The extraction unit 14 sets, in the image subjected to processing, a candidate area 101 whose radius is R and whose center is P1 (or P2). Then, the extraction unit 14 sets an area in which the candidate area 101 and a reference area 102 overlap each other to be a processing area 103. Subsequently, the extraction unit 14 performs edge detection as in the first embodiment.

According to the second embodiment, in comparison to the case of the first embodiment, the image processing apparatus 1 may provide a lower throughput for edge detection. In addition, the image processing apparatus 1 detects only edges existing in a processing area. Hence, in a subsequent edge-connecting process, the possibility that an incorrect edge is connected may be reduced. That is, the image processing apparatus 1 in the second embodiment may detect a hand area more accurately than that in the first embodiment.

Third Embodiment

Next, a third embodiment in which a hand area is extracted by making an appropriate adjustment corresponding to the user to a condition for extracting a skin color component will be described.

Figure 11:
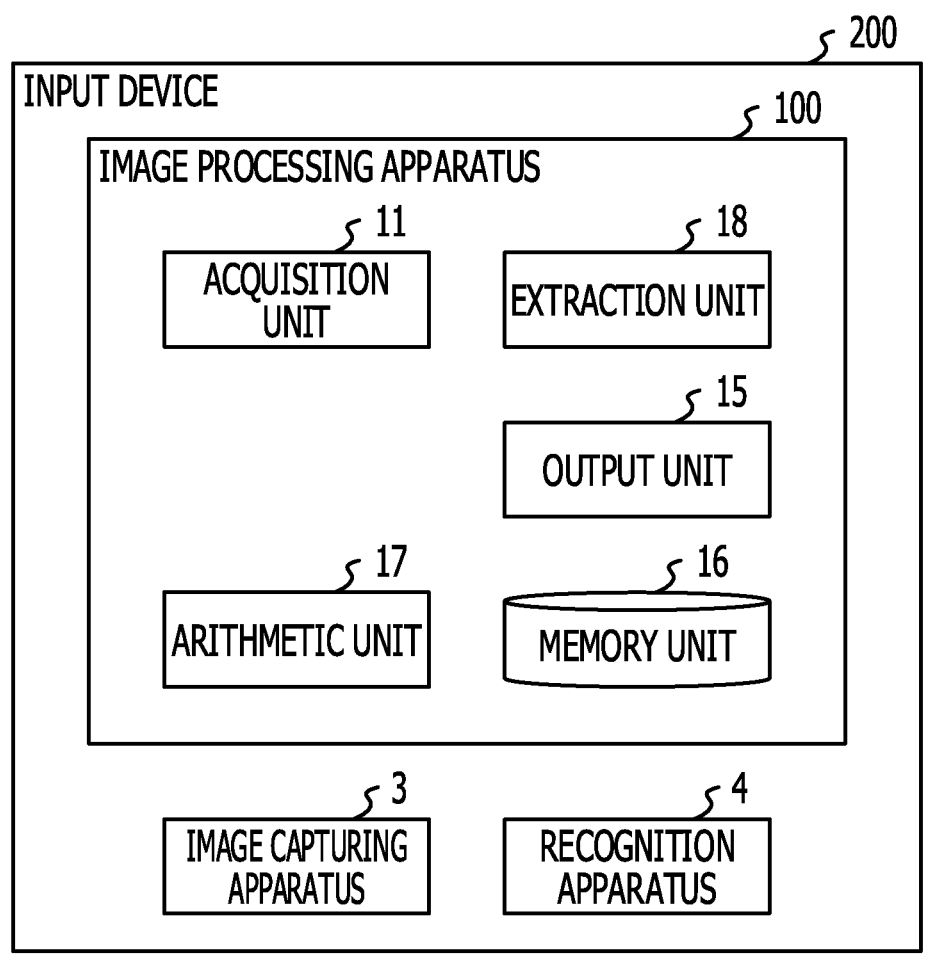
FIG. 11 is a functional block diagram of an image processing apparatus in a third embodiment.

FIG. 11 is a functional block diagram of an image processing apparatus in the third embodiment. An input device 200 includes an image capturing apparatus 3 and a recognition apparatus 4 that perform the same processes as those in the first embodiment. The input device 200 also includes an image processing apparatus 100. The image processing apparatus 100 includes an acquisition unit 11, an output unit 15, and a memory unit 16. The image processing apparatus 100 also includes an arithmetic unit 17 and an extraction unit 18.

The acquisition unit 11 and the output unit 15 perform the same processes as the acquisition unit 11 and the output unit 15 in the first embodiment. The arithmetic unit 17 extracts an area having a specific color component in an image not including a target object, and also generates a histogram of the extracted area. Furthermore, the arithmetic unit 17 extracts an area having a specific color component in an image including the target object and not including an area having a color similar to that of the target object, and also generates a histogram of the extracted area.

For example, the arithmetic unit 17 extracts an area having a skin color component from a background image and generates a histogram of the area having the skin color component in the background image. Also, the arithmetic unit 17 extracts an area having a skin color component in a hand image from an image of the user's hand and generates a histogram of the area having the skin color component in the hand image.

As for the histogram, a plurality of types of histograms are generated in accordance with a color system. For example, when a hand area is extracted by using color information in the HSV color system, histograms for H, S, and V are generated.

The arithmetic unit 17 calculates, by using the histogram in the image not including the target object and the histogram in the image including the target object and not including the area having a color similar to that of the target object, a condition for extracting the hand area from an image subjected to processing. The calculated condition is stored in the memory unit 16.

Figure 12:
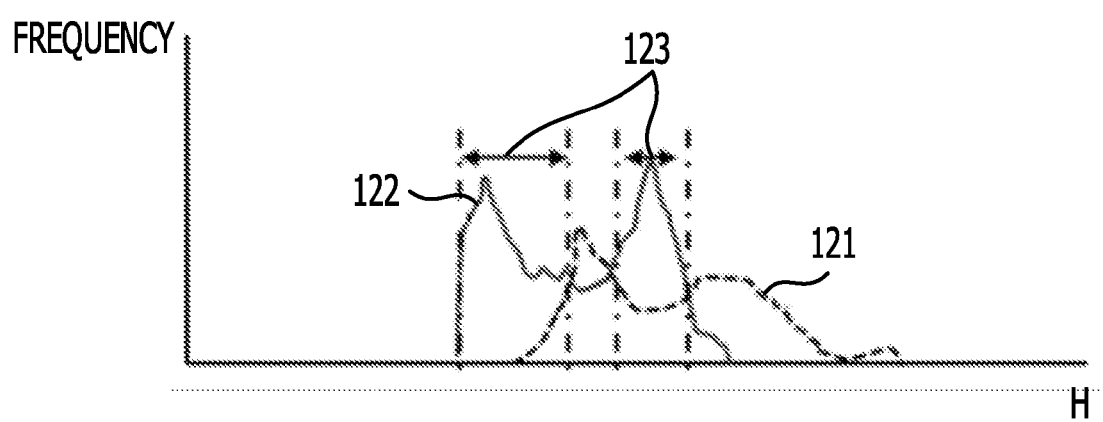
FIG. 12 is a diagram illustrating a condition for extracting a hand area.

FIG. 12 is a diagram illustrating a condition for extracting a hand area. In histograms illustrated in FIG. 12, the frequency of each value of an H component is indicated. A dashed line 121 denotes a histogram of an area having the skin color component in the image not including the user's hand. A solid line 122 denotes a histogram of an area having the skin color component in the image of the user's hand. In order to extract an area having the skin color component from each image, for example, the equations 1 and 2 are used as a provisional condition.

Referring back to FIG. 11, the arithmetic unit 17 uses these two histograms and obtains a value of H whose frequency in the histogram 122 is higher than that in the histogram 121. In FIG. 12, a range 123 is a range in which a value of H whose frequency in the histogram 122 is higher than that in the histogram 121 exists. The arithmetic unit 17 stores, as a condition to be used for a later hand-area-extracting process, information representing the range 123 in the memory unit 16. The condition calculated by the arithmetic unit 17 is a condition with which a hand area extracted by the hand-area-extracting process to be described later is maximized and an incorrectly detected area other than the hand area is minimized.

The extraction unit 18 extracts the hand area from the image subjected to processing by using the condition calculated by the arithmetic unit 17. For example, the extraction unit 18 converts color information of the image subjected to processing into color information in the HSV color system. Then, the converted color information is compared with the condition, and a binary image is generated. By using the binary image, the hand area is identified. The extraction unit 18 masks an area other than the hand area in the image subjected to processing and thereby generates a mask image.

Also, the extraction unit 18 may perform a smoothing process or the like on the area extracted as a provisional hand area by using the condition, and thereby identify a hand area in the provisional hand area. The extraction unit 18 corrects, by using the smoothing process, an area that satisfies the condition but is an area other than the hand, or an area that is originally the hand area but does not satisfy the condition.

As for the smoothing process, for example, dilation and erosion processes described in "Hasegawa, Jun-ichi, and others, *Basic Technique of Image Processing—Guide to Technique—*, Gijutsu Hyoron Sha, 1986" are applied. The smoothing process is performed, and a noise portion that forms the area that satisfies the condition but is the area other than the hand area is thereby removed.

Figure 13:
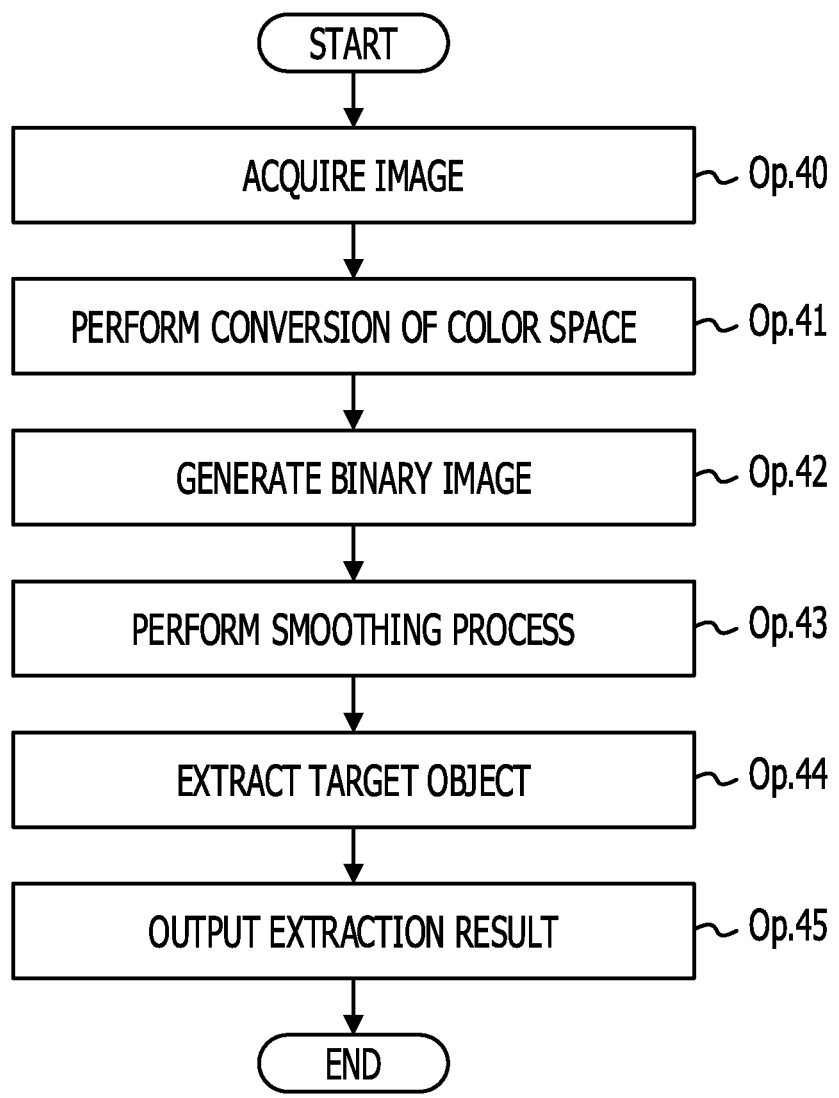
FIG. 13 is a flowchart of an image processing method in the third embodiment.

FIG. 13 is a flowchart of an image processing method in the third embodiment. Prior to this processing, the arithmetic unit 17 calculates, by using the above technique, the condition for distinguishing a target object from an area having a color similar to that of the target object under the provisional condition.

The acquisition unit 11 acquires an image (Op. 40). It is assumed that the image acquired here is an image subjected to processing, and the following processing is performed. The extraction unit 18 converts a color space of color information of the image into a color space in the HSV color system (Op. 41). When an image in the HSV color system is acquired, this conversion does not have to be performed.

Next, the condition is read from the memory unit 16, and a binary image is generated by using the condition and the converted color information (Op. 42). In the binary image, "1" is assigned to a pixel that satisfies the condition and "0" is assigned to a pixel that does not satisfy the condition. An area constituted by a pixel having a pixel value "1" in the binary image represents a provisional hand area.

Next, the extraction unit 18 smoothes the binary image (Op. 43). As described above, a hand area is identified from the provisional hand area in the binary image by using the smoothing process. Then, the extraction unit 18 extracts, from the image subjected to processing, a portion corresponding to the hand area in the binary image (Op. 44). That is, the target object is extracted from the image of the target object. For example, the extraction unit 18 masks an area other than the hand area in the image subjected to processing, and thereby generates a mask image in which the target object is extracted. Finally, the output unit 15 outputs an extraction result to the recognition apparatus 4 (Op. 45).

As described above, by using the condition for distinguishing a target object from an area having a color similar to that of the target object under the preset provisional condition, the target object may be extracted. That is, the image processing apparatus 100 according to this embodiment may generate, by using a color histogram, an appropriate condition so as to extract the target object. The condition is a condition with which a hand area extracted by the hand-area-extracting process is maximized and an incorrectly detected area other than the hand area is minimized.

When the provisional condition is applied, the target object may not be able to be distinguished from the area having a color similar to that of the target object. However, the image processing apparatus 100 according to this embodiment extracts the target object by using the new condition in which the color histogram of the user's hand is incorporated.

The above embodiments may be modified in the following manner.

Figure 14:
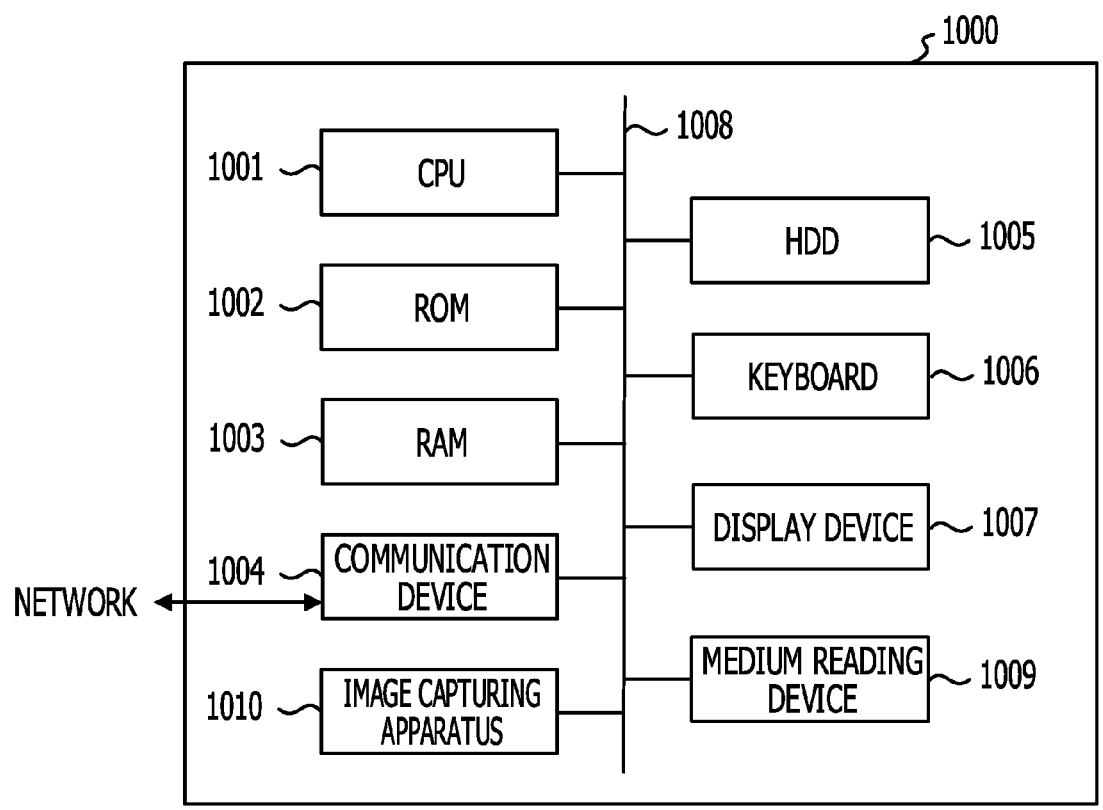
FIG. 14 illustrates an example of a hardware configuration of the image processing apparatus in first and second embodiments or the image processing apparatus in the third embodiment.

FIG. 14 illustrates an example of a hardware configuration of the image processing apparatus 1 or the image processing apparatus 100. A computer 1000 executes the above-described image processing method according to each embodiment and functions as the image processing apparatus 1 or the image processing apparatus 100. In some cases, the computer 1000 functions as the information processing apparatus 10 or the input device 2.

The computer 1000 includes a central processing unit (CPU) 1001, a read only memory (ROM) 1002, a random access memory (RAM) 1003, a hard disk drive (HDD) 1005, a display device 1007, and a medium reading device 1009. The computer 1000 may further include a communication device 1004, a keyboard 1006, and an image capturing apparatus 1010. These devices are connected to each other via a bus 1008. Each device is capable of transmitting and receiving data to and from the other devices under the control of the CPU 1001.

Image processing programs in which the image processing methods indicated by the flowcharts illustrated in FIGS. 6 and 13 are described are stored in a computer-readable storage medium. Examples of the computer-readable storage medium include a magnetic recording apparatus, an optical disc, a magneto-optical recording medium, and a semiconductor memory. Examples of the magnetic recording apparatus include an HDD, a flexible disk (FD), and a magnetic tape (MT).

Examples of the optical disc include a digital versatile disc (DVD), a DVD-RAM, a compact disc-read only memory (CD-ROM), a CD-recordable (CD-R), and a CD-rewritable (CD-RW). Examples of the magneto-optical recording medium include a magneto-optical (MO) disk and the like. In the case where each program is distributed, for example, the sale of a portable storage medium, such as a DVD or CD-ROM in which the program is stored, has been considered.

In the computer 1000 that executes each image processing program, for example, the medium reading device 1009 reads the image processing program from the storage medium in which the program is stored. When the program in which the process illustrated in FIG. 6 is described is read out and executed, the computer 1000 functions as the image processing apparatus 1. On the other hand, when the program in which the process illustrated in FIG. 13 is described is read out and executed, the computer 1000 functions as the image processing apparatus 100.

The CPU 1001 stores the read program in the HDD 1005, the ROM 1002, or the RAM 1003. The CPU 1001 is a central processing unit that manages operation control of the entire image processing apparatus. The HDD 1005 stores the program in which the process illustrated in FIG. 6 or 13 is described and which has been stored by the CPU 1001.

When the CPU 1001 reads, from the HDD 1005, the image processing program in which the process illustrated in FIG. 6 is described, and executes it, the CPU 1001 functions as the acquisition unit 11, the generation unit 12, the determination unit 13, the extraction unit 14, and the output unit 15 that are illustrated in FIG. 3. In the image processing program, the process illustrated in FIG. 4 may be further described. The image processing program may be stored in the ROM 1002 or the RAM 1003 accessible from the CPU 1001.

On the other hand, when the CPU 1001 reads, from the HDD 1005, the program in which the process illustrated in FIG. 13 and a condition-calculating process are described, and executes it, the CPU 1001 functions as the acquisition unit 11, the output unit 15, the arithmetic unit 17, and the extraction unit 18 that are illustrated in FIG. 11.

The HDD 1005 functions as the memory unit 16 illustrated in FIG. 3 or 11 under the control of the CPU 1001. Like the program, information used for image processing in each embodiment may be stored in the ROM 1002 or the RAM 1003 accessible from the CPU 1001. That is, data in the memory unit 16 is stored in a storage device, such as the HDD 1005, the ROM 1002, or the RAM 1003. The RAM 1003 also stores information temporarily generated in the course of the process.

The display device 1007 displays a screen. The communication device 1004 receives a signal from another device via a network, and passes content of the signal to the CPU 1001. Furthermore, the communication device 1004 transmits a signal to another device via the network in accordance with an instruction from the CPU 1001.

The keyboard 1006 accepts user input of information. The computer 1000 may include a touch panel, a stylus, or the like, as a device for input, in place of the keyboard 1006. The image capturing apparatus 1010 takes an image at certain frame intervals. The image capturing apparatus 1010 digitizes the taken image and outputs it to the CPU 1001. The image capturing apparatus 1010 includes, for example, a charge coupled device (CCD) sensor or a complementary metal oxide semiconductor (CMOS) sensor. For example, the image capturing apparatus 1010 captures an image including the user's hand, which is a target object, converts analog image information into digital image information, and outputs the digital image information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing apparatus for identifying a target area of a target object in an image, the image processing apparatus comprising:
   a memory; and
   a processor coupled to the memory and configured to:
      receive a reference image,
      store, into the memory, reference area information of a reference area, the reference area being extracted from the reference image using a color condition,
      receive the image,
      generate specific area information of specific area in the image, the specific area being extracted from the image using the color condition and including the reference area and the target area,
      determine whether or not there is an overlap between the reference area and the target object based on the reference area information and the specific area information,
      when the overlap does not exist, identify the target area corresponding to a difference area between the specific area and the reference area, and
      when the overlap exists, extract an overlap area corresponding to a part of the target object overlapping the reference area from the image based on color information of the reference area and another color information of the specific area, identify the target area corresponding to the difference area and the overlap area, and perform edge detection only in the identified target area.

2. The image processing apparatus according to claim 1, wherein the processor is configured to, when the overlap exists, identify, by using a difference between the color information and the another color information, the overlap area.

3. The image processing apparatus according to claim 2, wherein the processor is configured to:
   detect edges by using the difference,
   identify an outline of the overlap by using the edges, and
   identify the overlap area by using the outline.

4. The image processing apparatus according to claim 3, wherein the processor is configured to:
   set, from among pixels that form a boundary between the difference area and the reference area, a first pixel and a second pixel,
   connect the detected edges from an edge close to the first pixel or an edge close to the second pixel, and
   identify the outline by using a result of connecting the edges from the edge close to the first pixel and a result of connecting the edges from the edge close to the second pixel.

5. The image processing apparatus according to claim 1, wherein the processor is configured to:
   identify the difference area, and
   when the difference area is in contact with the reference area, determine that the overlap exists.

6. An image processing method for identifying a target area of a target object in an image that is executed by a computer, the image processing method comprising:
   receiving a reference image,
   storing, into a memory, reference area information of a reference area, the reference area being extracted from the reference image using a color condition;
   generating specific target area information of specific area in the image, the specific area being extracted from the image using the color condition and including the reference area and the target area;
   determining whether or not there is an overlap between the reference area and the target object based on the reference area information and the specific area information;
   when the overlap does not exist, identifying the target area corresponding to a difference area between the specific area and the reference area; and
   when the overlap exists, extracting an overlap area corresponding to a part of the target object overlapping the reference area from the image based on color information of the reference area and another color information of the specific area, identifying the target area corresponding to the difference area and the overlap area, and performing edge detection only in the identified target area.

7. The image processing method according to claim 6, further comprising:
   when the overlap exists, identifying, by using a difference between the color information and the another color information.

8. The image processing method according to claim 7, further comprising:
   detecting edges by using the difference;
   identifying an outline of the overlap by using the edges; and
   identifying the overlap area by using the outline.

9. The image processing method according to claim 8, further comprising:
   setting, from among pixels that form a boundary between the difference area and the reference area, a first pixel and a second pixel;
   connecting the detected edges from an edge close to the first pixel or an edge close to the second pixel; and
   identifying the outline by using a result of connecting the edges from the edge close to the first pixel and a result of connecting the edges from the edge close to the second pixel.

10. The image processing method according to claim 6, further comprising:
    identifying the difference area; and
    when the difference area is in contact with the reference area, determining that the overlap exists.

11. A non-transitory computer-readable storage medium storing an image processing program for causing a computer to execute a process for identifying a target area of a target object in an image, the process comprising:
    receiving a reference image,
    storing, into a memory, reference area information of a reference area, the reference area being extracted from the reference image using a color condition;
    generating specific target area information of specific area in the image, the specific area being extracted from the image using the color condition and including the reference area and the target area;

determining whether or not there is an overlap between the reference area and the target object based on the reference area information and the specific area information;

when the overlap does not exist, identifying the target area corresponding to a difference area between the specific area and the reference area; and when the overlap exists, extracting an overlap area corresponding to a part of the target object overlapping the reference area from the image based on color information of the reference area and another color information of the specific area, identifying the target area corresponding to the difference area and the overlap area, and performing edge detection only in the identified target area.

12. The non-transitory computer-readable storage medium according to claim 11, the process further comprising:

when the overlap exists, identifying, by using a difference between the color information and the another color information.

13. The non-transitory computer-readable storage medium according to claim 12, the process further comprising:

detecting edges by using the difference;

identifying an outline of the overlap by using the edges; and identifying the overlap area by using the outline.

14. The non-transitory computer-readable storage medium according to claim 13, the process further comprising:

setting, from among pixels that form a boundary between the difference area and the reference area, a first pixel and a second pixel;

connecting the detected edges from an edge close to the first pixel or an edge close to the second pixel; and identifying the outline by using a result of connecting the edges from the edge close to the first pixel and a result of connecting the edges from the edge close to the second pixel.

15. The non-transitory computer-readable storage medium according to claim 11, the process further comprising:

identifying the difference area; and when the difference area is in contact with the reference area, determining that the overlap exists.

* * * * *